United States Patent Office 3,378,474
Patented Apr. 16, 1968

3,378,474
PROCESS OF REMOVING ALKYL
BENZENE SULFONATE
William G. Green, 4925 Camellia Way S.,
St. Petersburg, Fla. 33705
No Drawing. Filed May 28, 1964, Ser. No. 371,086
6 Claims. (Cl. 204—149)

ABSTRACT OF THE DISCLOSURE

A composition of chemicals and means for applying same for increasing the foaming action and the precipitation of solids which coagulate effectively with alkyl benzene sulfonate to remove this and other deleterious substances from waste water including laundry water, consisting of combining alum, calcium chloride, sodium carboxy methyl cellulose and di methyl sulfoxide, and applying same by inducing turbulence and aeration and electrolytic means for inducing fine bubbles with a jet exhauster for ejecting the foam.

The present invention relates to purification of water solution and in particular the use of a foaming compound for removing alkyl benzene sulfonate from laundry water.

The purpose of this invention is to convert the alkyl benzene sulfonate hereinafter designated as ABS of laundry water to harmless form such as suds or foam which is drawn into a burner, where the water is converted into steam and the ABS forms $CO_2$ and other degradable compounds or harmless gases.

Heretofore papers have been published describing a method of removing approximately 85% of the ABS (detergent) from a water solution by aeration. In practice it has been possible to reduce a detergent-water solution from a value of 460 p.p.m., ABS, to 30 p.p.m., ABS, by aeration alone. The various States of the United States of America, however, wish to limit the amount of ABS which may be introduced into sewer systems, or into the ground, to 0.5 p.p.m., which has not, thus far been accomplished. Therefore, the soap and chemical companies have undertaken a method of development of a soft or biodegradable type of detergent.

I have heretofore, in my patent application, Ser. No. 340,920, filing date Jan. 29, 1964, now abandoned, entitled "Waste Water Recovery System," described a method which will remove ABS almost in its entirety.

Subsequent developments have simplified the method, reducing its first cost, as well as the cost of chemicals used.

In the aeration of water from laundries, and the like, it has been found that if the water forms suds, and these are removed, that the ABS content of the water is reduced. But some wash water will not form suds, with ordinary aeration, and the low level of ABS achieved depends upon the point at which suds cease to form. What has been done is to add "foaming" agents, and coagulants which would normally be expected to weaken or dissipate the soap or detergent. It was observed that certain organic products, such as dirt, soil, fats, wood or cellulose, and certain inorganic compounds such as calcium chloride, calcium sulfate, zinc chloride, and the like, "used up" the soap or detergent, and would cause considerable foaming; and precipitation of solids, soap, detergent, and the like, and that finally, when a very low level of ABS remained in the treated water—as 1–2 p.p.m., that coagulation with alum and sodium hydroxide or sodium carbonate would further reduce this to below 0.5 p.p.m. ABS. (In some cases, values of 0.0 p.p.m. ABS have been obtained, and values as low as 0.4 p.p.m. can always be obtained.)

The object of this invention is, therefore, to provide means for removing ABS from laundry water containing soap compounds and detergents.

Another object of this invention is to provide means for removing foaming compounds containing ABS from laundry water by the use of carbon electrodes.

A further object of this invention is to provide a method of removing ABS from laundry water in which electrolysis is used.

A still further object is to provide apparatus for removing ABS from water containing soap and other detergents in which fresh water that is pure, clear, odorless, drinkable and reusable is obtained.

And a still further object is to provide means for removing ABS from water containing soap and other detergents in which the process is comparatively simple and inexpensive.

With these and other objects and advantages in view the invention embodies a water purification process wherein the process consists in:

(1) Adding to waste (laundry) water, per gallon, the following:

Alum, 0.5 cc. or 130 p.p.m., approximate composition, not critical, and is naturally affected by the waste water content;
$CaCl_2$, 0.05 cc. or 13 p.p.m.
Sodium carboxymethyl cellulose, 0.15 cc. or 39 p.p.m.
dimethyl sulfoxide, .15 cc. or 39 p.p.m.

Agitate the ingredients for one hour with the aerated water column, as produced with a water pump and a jet exhauster. Simultaneously, electrolyze the solution with carbon electrodes, using a direct current of approximately .003 amperes per in.$^2$ of surface area. Remove the foam as fast as it forms.

(2) At the end of the hour, continue agitation for five minutes, adding alum, 130 p.p.m. and neutralize to pH 7.3–7.8, with NaOH or $Na_2CO_3$, removing the foam, (3) Continue electrolysis, only, for 30 minutes, and then (4) Settle for 10–15 minutes, and (5) Decant, or draw off the clear, ABS free water.

This water is pure, clear, odorless, drinkable, and reusable.

Obviously the times, sequences, and amounts, as well as the kinds or brands of chemicals are subject to wide variation, as similar results have been obtained in these experiments, using many different products, producing similar results, as far as foaming, soap reduction, foam stability, and the like, are concerned.

To convert the alkyl benzene sulfonate to harmless foam, the suds or foam is drawn into a burner, where the water is converted to steam, and the ABS forms $CO_2$ and other degradable compounds, or harmless gases.

From the foregoing description it is thought to be obvious that the improved process of removing alkyl benzene sulfonate from laundry water as described in this invention is particularly well adapted for use, by reason of the convenience and facility with which it may be compounded and used, and it will also be obvious that the invention is susceptible of some change and modification without departing from the principles and spirit thereof, and for this reason it is not desired to be limited to the precise compound of the several parts herein shown in carrying out the invention in practice, except as claimed.

What is claimed is:

1. The process of removing alkyl benzene sulfonate from waste or laundry water which comprises adding to waste or laundry water to reach the following proportions, alum, 130 p.p.m., $CaCl_2$, 13 p.p.m., sodium carboxy methyl cellulose, 39 p.p.m. and di methyl sulfoxide, 39 p.p.m.; agitating for one hour with an aerated water column, as produced with a water pump and a jet exhauster, simultaneously, electrolyzing the solution with carbon electrodes, using a direct current of approximately .003 amperes per in.² of surface area, removing foam as it forms, continuing agitation an additional five minutes adding additional alum and NaOH in this period, continuing electrolysis for 30 minutes, removing the foam, settling the percipitates for 10 to 15 minutes, and drawing off the clear alkyl benzene sulfonate free water.

2. The process as described in claim 1, wherein the ingredients are used in the following proportions:

Alum, 130 p.p.m.
$CaCl_2$, 13 p.p.m.
Sodium carboxy methyl cellulose, 39 p.p.m.
$CH_3SOCH_3$, 39 p.p.m.

3. The process as described in claim 1, wherein the quantity of alum added to the treated waste water in the additional five minutes period is 130 p.p.m. and this is neutralized to pH 7.3–7.8 with $Na_2CO_3$.

4. The process as described in claim 1, wherein the quantity of alum added to the treated waste water in the additional five minutes period is 130 p.p.m. and this is neutralized to pH 7.3–7.8 with NaOH.

5. The process as described in claim 4, wherein electrolysis is continued for 30 minutes, the foam being removed.

6. The process as described in claim 4, wherein electrolysis is continued for a period of 30 minutes, the solution permitted to settle for from ten to fifteen minutes, and the pure, clear, alkyl benzene sulfonate free water drawn off.

References Cited
UNITED STATES PATENTS

| | | | |
|---|---|---|---|
| 767,195 | 8/1904 | Zerbe | 210—63 X |
| 2,313,007 | 3/1943 | Abribat | 252—303 |

OTHER REFERENCES

Klein and McGauhey, "Detergent Removal by Surface Stripping," Water Pollution Control Federation Journal, vol. 35, No. 1, January 1963, pps. 114 and 115.

HOWARD S. WILLIAMS, *Primary Examiner.*

JOHN H. MACK, *Examiner.*

A. C. PRESCOTT, *Assistant Examiner.*